United States Patent [19]
Berthet et al.

[11] 3,856,182
[45] Dec. 24, 1974

[54] APPARATUS FOR REGULATING MOLTEN METAL SUPPLY

[75] Inventors: Aristide Berthet; Jacques Blum, both of Metz, France

[73] Assignee: Institut De Recherches De La Siderurgie Francaise (IRSID), Saint Germain-en-Laye, France

[22] Filed: Nov. 7, 1973

[21] Appl. No.: 413,662

Related U.S. Application Data

[63] Continuation-in-part of Ser. No. 230,746, March 1, 1972, Pat. No. 3,773,218.

[52] U.S. Cl.................. 222/56, 164/155, 164/281
[51] Int. Cl............................................ B22d 37/00
[58] Field of Search...... 164/155, 281, 337; 222/56, 222/76, 166

[56] References Cited
UNITED STATES PATENTS

| | | | |
|---|---|---|---|
| 2,882,567 | 4/1959 | Deakins et al. | 222/166 UX |
| 3,408,059 | 10/1968 | Hornak | 164/281 X |
| 3,457,985 | 7/1969 | Wilson | 164/155 |

*Primary Examiner*—Robert B. Reeves
*Assistant Examiner*—David A. Scherbel

[57] ABSTRACT

Apparatus for maintenance of a constant supply of molten metal in metallurgical equipment. A supply ladle alternately feeds into one of two intermediate tipping vessels. The tipping of one vessel is initiated when a predetermined emptying value of the other vessel is reached, and the flow of metal flowing from the one vessel is brought to a zero value when the flow of metal flowing from the one vessel is detected. Vessels in operative position are continuously weighed to generate a voltage signal that corresponds to the emptying weight, and this signal is compared with a reference voltage signal so that a differential voltage produced thereby can control the rate of tipping of one of the vessels.

7 Claims, 4 Drawing Figures

APPARATUS FOR REGULATING MOLTEN METAL SUPPLY

This application is a continuation-in-part of application Ser. No. 230,746, filed Mar. 1, 1972, now U.S Pat. 3,733,218.

BROAD STATEMENT OF INVENTION

This invention relates to regulation of the feed supply of molten metal and is particularly concerned with a plurality of alternately tipping and filling intermediate vessels maintaining a constant flow.

DESCRIPTION OF THE PRIOR ART

A certain number of proposals have heretofore been made with a view to achieving constant molten metal flow. One of these consists in feeding an intermediate vessel by means of a large capacity ladle the bottom of which is fitted with a nozzle which can be opened or closed by means of a plug. The intermediate vessel is mounted on a weighing mechanism and includes in its lower part a flow outlet constituted by a calibrated nozzel. The regulation of flow is obtained by maintaining the level of metal in the intermediate vessel between two fixed limits. The continual weighing of this vessel enables determination of any difference in flow in relation to the desired quantity and the bringing of the flow back to the desired quantity by maintaining the level between the limits in the intermediate vessel. It will be understood that variations in flow caused by a modification of the diameter of the flow outlet may thus be corrected to some extent. It is equally apparent that, where large modifications of the diameter are involved, it is no longer possible to bring the flow back to the desired quantity. Moreover, the reliability of the device is linked to the care of the plug and the seating of the nozzle. The wear of the nozzle may cause variation in the flow if operations of long duration, possibly as long as a week, are involved. In addition, the formation of defects in the nozzle, or at the outlet from the nozzle, is a possibility, and these defects may modify the flow conditions and sometimes bring about stoppage of the supply.

It is further known to flow measured quantities of metal into molds by way of intermediate vessels which are filled with metal and are emptied by tipping. The mass of metal is determined by the weighing of the intermediate vessels. However, these devices operate only in a discontinuous manner and do not at all assure continuous and regular flow of molten metal.

DESCRIPTION OF THE INVENTION

The object of the present invention is to obviate or mitigate the disadvantages of changing molten metal supply and to provide an apparatus for achieving a predetermined and regular flow of such metal from tipping vessels.

According to the present invention, a substantially constant flow of metal to a metallurgical plant from at least two intermediate tipping vessels is obtained by providing an apparatus which tips a filled intermediate vessel to obtain a flow of metal, continuously weighs the vessel as it is being tipped so as to determine the flow of metal running out of said vessel, compares the flow of metal with a reference quantity representing a constant flow of metal, developes from the determined flow and the reference quantity a differential signal, adjusts the rate of tipping of the intermediate vessel while metal is running out therefrom so as to bring said differential signal back to a substantially zero value, stops the tipping of the intermediate vessel while metal is running out therefrom, and initiates the tipping of another filled vessel when the first vessel from which metal is running out reaches a predetermined degree of emptying.

Preferably, the apparatus enables the practice of a method which includes detecting the appearance of flow of metal from the one vessel at the start of tipping, developing a signal at the moment when such flow of metal appears and initiating through this signal the elimination of the flow of metal from the other vessel at the end of tipping and the taking over by regulation equipment of the control of the rate of tipping of the one vessel at the start of tipping.

Alternatively, the method which may be practiced by use of the apparatus includes detecting the appearance of flow of metal from one of two intermediate vessels at the start of tipping, developing a signal at the instant such flow appears, and, by means of such signal, controlling stoppage of the tipping of the other vessel, the metal continuing to be emptied from the other vessel at a decreasing rate, initiating control by regulation equipment of the vessel at the start of tipping through summing the flows running out of the two intermediate vessels, and acting on the flow from the vessel controlled by the regulation equipment so as to regulate the total flow.

The signal for stopping the tipping may equally well be generated by a weight limit of the vessels or a geometrical position of the vessels.

Thus, according to the present invention, apparatus is provided for supplying a substantially constant flow of metal to a metallurgical plant, comprising means for detecting the appearance of the flow of metal discharging from the intermediate vessels, means for weighing each vessel being discharged and determining the actual flow of metal, means for providing a reference quantity corresponding to a constant feed flow, comparison means for developing a differential signal by comparing the actual flow and the constant feed flow, and means for controlling the tipping rate of the vessel being made operative by the differential signal developed by the comparison means.

It will be understood that the present invention eliminates any outflow orifice and avoids in this way any risk of stoppage arising from deterioration of such an orifice. The reliability of the equipment is thereby improved; the regularity of the flow proves however to be more difficult to achieve in consequence of the discharge of the metal through tipping of the vessel. The present invention is therefore seen to provide a method of supply in which the flow of metal is controlled in a very careful manner, in such a way as to quickly compensate for possible variations in the flow.

In order to obtain a continuous flow of molten metal, for example, from a metallurgical vessel of large capacity, the supply is effected alternately with at least two intermediate vessels of less capacity which are emptied by tipping one after the other. This enables, on the one hand, precise control to be achieved, and, on the other hand, the making use of the time of emptying of the one vessel for the readying or filling of the other vessel. It will be understood that, knowing the time necessary for readying or filling an intermediate vessel, the capacity of the intermediate vessels can be arranged to be such that, during the emptying of one, the filling or readying of another full intermediate vessel can be effected. There is, therefore, no interruption in the procedure which results in a continuous supply of metal.

An embodiment of the invention will now be described, by way of example, with reference to the accompanying drawings, in which.

Figure 1:
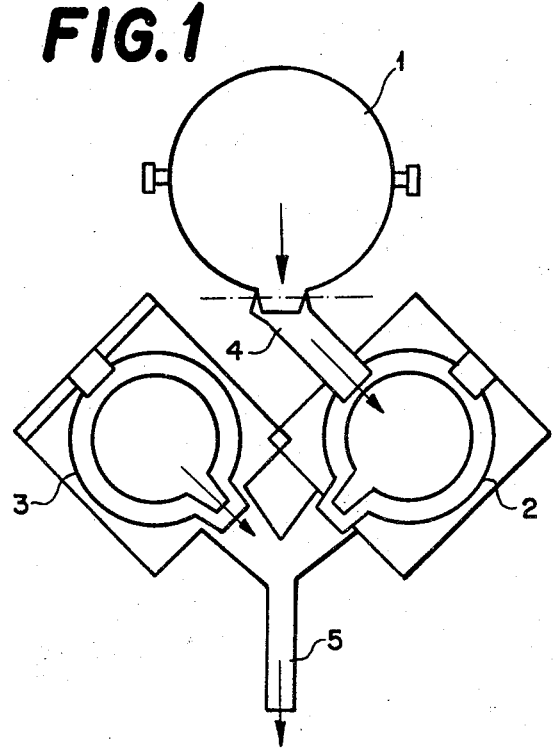
FIG. 1 is a simplified diagrammatic representation of a supply device which may be employed in accordance with the invention.

There is shown in FIG. 1, in a very simplified form, one possible embodiment of a supply device comprising a primary ladle 1 which feeds two intermediate vessels 2 and 3. As shown, ladle 1 is located on a tipper and discharges into a runner conduit 4 whose direction of extension can be selected to enable supply of the metal to one or another of the intermediate vessels. In the situation shown, vessel 2 is in the process of being filled by flow through conduit 4, and vessel 3 is in the process of emptying or discharging its supply of molten metal through a two-branched channel 5. It is to be understood that feed ladle 1 is operable to fill intermediate vessels 2 and 3 alternately. In the embodiment shown, this switching of the direction of flow of the metal from ladle 1 is effected by swinging or pivoting conduit 4, but it could be achieved by displacement of the ladle while suspended on a bridge, or by displacement of the ladle along rails. In order to maintain the regulation of the feed, vessels 2 and 3 are weighed as they discharge by known means (not shown), for example, by means of an extensometric-gauge measuring bridge such as is described in French Pat. No. 1473044. Tipping is effected, for example, by hydraulic jacks (not shown) which are so disposed that the value of their support reaction does not interfere with the weighing of the vessels.

Reverting to FIG. 1, it will be understood that the continuity of the feed is insured by the alternate filling-up of one of the intermediate vessels and the tipping of the other during filling-up of the one. When supply ladle 1 is empty, it is replaced by another, the capacities of the three vessels being predetermined in order that this change-over, as well as the possible replacement of an intermediate vessel can be effected without interrupting the feed, i.e., during the period of emptying of an intermediate vessel.

In order to ensure the regular feed of metal, the intermediate vessels are weighed at each instant in the course of emptying as to the weight of metal emptied and the feed of metal to be calculated. Then, in a regulator device, this feed is compared with a reference feed and the difference acts upon the tipping rate so that this difference can be eliminated. It is obvious that any parameter could be used as a reference parameter as long as it related to the feed without thereby departing from the regulator principle.

When an intermediate vessel is almost empty, a signal, for example a minimum weight reached, automatically initiates the tipping of the second intermediate vessel. This tipping is effected at high speed until the flow of metal is detected by suitable means such as photoelectric cells. For the next step, two manners of procedure may then be considered.

In one of these, the excitation of the feed detection means causes, on the one hand, the stopping of the feed to the one intermediate vessel at the end of discharge, for example by causing quick return to the initial disposition of this vessel, and on the other hand the taking over by the regulator of the control of the rate of tipping of the second vessel at this time. In this case there is therefore complete interruption in one metal feed and its replacement by another.

In the other procedure, the excitation of the feed-detection means causes, on the one hand, stoppage of the tipping of the one vessel at the end of discharge while allowing the one vessel to continue decreasing feed, and on the other hand, the taking over by the regulator of the control of the rate of tipping of the second vessel. For a few moments (up to stoppage of the feed of the first vessel), the regulation acts so that the sum of the two feeds is equal to the reference feed; and there is overlapping of the two tippings.

Figure 2:
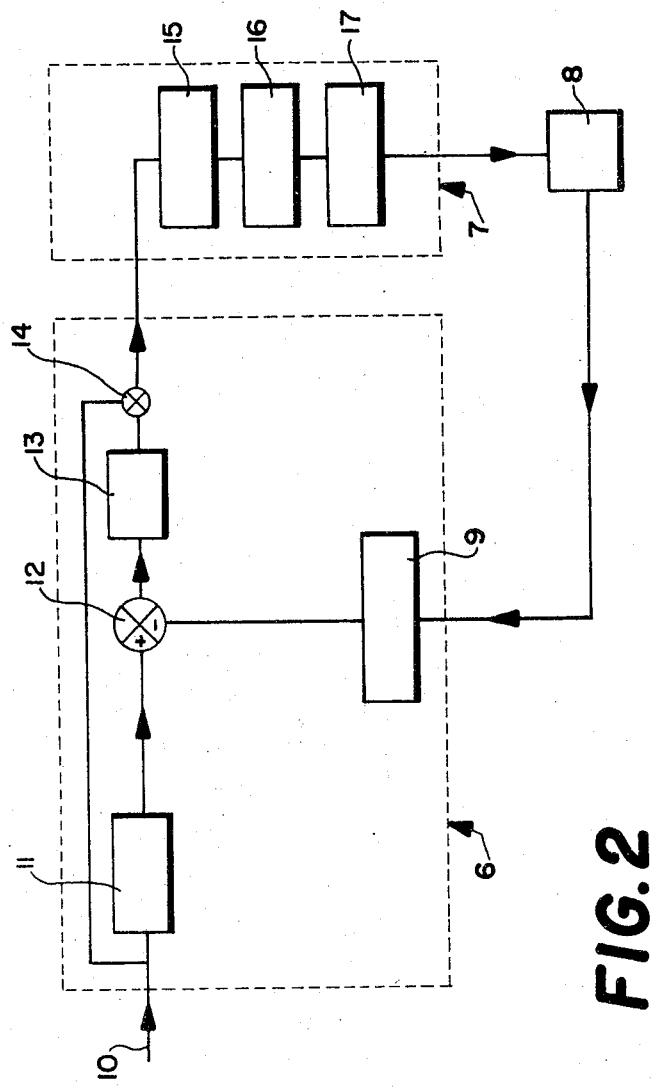
FIG. 2 is a simplified block diagram of a flow regulation in accordance with the invention.

Referring now to FIG. 2, a basic form of a regulation device in accordance with the invention will be described.

In FIG. 2, which diagrammatically represents the regulation circuit, it is separated into two parts, the first of which, denoted by the reference numeral 6, insures the regulation; and the second of which, denoted by the reference numeral 7 insures the tipping of the intermediate vessel which is being regulated at any time. A weighing means 8 is provided for each vessel, so that there are as many weighing means as there are intermediate vessels. The weighing means 8 constantly provides the weight of the vessels, these data being introduced into regulation part 6 through the intermediary of an analyzer 9 which provides a signal representing the weight of metal which has been emptied from the vessel during the course of emptying the vessel. Moreover, a reference feed quantity 10 is fed into regulation part 6 which makes available, through the intermediary of a timer 11, the weight of metal provided for the feed. These two quantities, namely the weight of metal provided and the weight of metal emptied, are introduced into a differential counter 12 which develops a differential signal that is then treated by an integrating regulator 13 which supplies a voltage which, as can be seen, is added to the reference voltage at 14. This voltage is applied to the tipping assembly which comprises a variator 15 and a motor 16 which controls the tipping of an intermediate vessel 17. It will readily be understood that any difference in the measured flow of metal in relation to the reference quantity gives rise to an appropriate change in the supply voltage of motor 16 controlling the tipping so as to eliminate the recorded difference in flow. In the event of two flows of metal momentarily co-existing, the sum of the two is introduced into the regulation assembly and the flow is regulated by acting upon the flow of metal running out of the intermediate vessel at the start of tipping.

The analyzer 9 receives at its input an analog signal representing the weight of a vessel. There are as many analyzers 9 as there are intermediate vessels. Each analyzer 9 is adapted to deliver at its output a signal in binary notation, the magnitude of which represents the loss of weight — $\Delta P$, if any, of the corresponding vessel. An analyzer may therefore comprise means for generating a numeric value corresponding to the difference between the weight of the vessel when full and the weight of the vessel at any instant of measurement, as far as said difference relates to a loss of weight of said vessel; e.g. there is no output signal as long as there is no loss of weight of the vessel. The coding into binary form may be readily obtained by means of a coder driven in a well known manner by a clock, the binary value being delivered at the frequency of the clock.

The timer 11 comprises a clock which delivers the time value $t$. Said timer is adapted to generate at its output a numeric signal in binary notation the magnitude of which corresponds to the instantaneous value of the product $Q \times t = P$ where $Q$ is a given constant representing the desired feed $Q$. This constant is determined by a constant voltage applied to line 10.

The differential counter 12 forms the difference between the desired weight P and the loss of weight $\Delta P$, said difference being either a positive or a negative number in binary notation. Said binary number is decoded and converted into an analog datum at the input of regulator 13, which is a conventional regulator, the output signal of which may be proportional to the input signal, but is generally further corrected by terms taking into account the integral and the derivative of the input signal for the sake of stability of the regulation procedure. The output signal of regulator 13 is added to the reference voltage applied to line 10 by means of operational amplifier 14.

Since there is only one vessel at a time which stays under control of the regulation equipment, it is possible to employ a system having a single variator 15, the switching of said variator to the adequate vessel occurring for example by means of hydraulic distributors.

It will be noted that this metal flow device and the regulation assembly is capable of operating whatever the shape of the intermediate vessels, and that they enable compensation of any variation in their internal form which could occur through wearing of their refractories.

Figure 3:
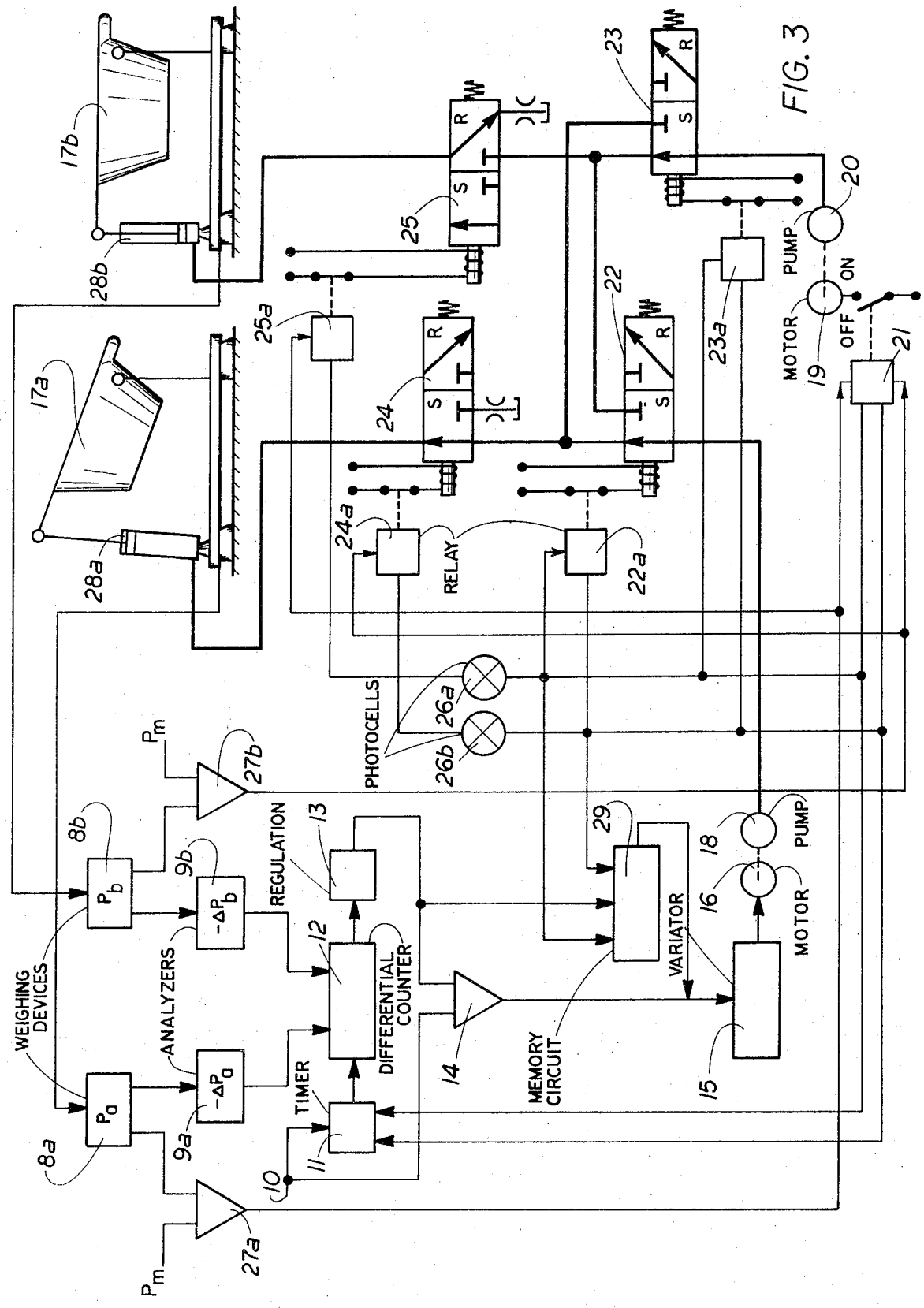
FIG. 3 is a more complete block diagram of a flow regulation system in accordance with one embodiment of the invention.

FIG. 3 illustrates an apparatus for regulating the flow according to the first procedure above described, in which the excitation of the feed detection means causes on the one hand the returning of the intermediate vessel at the end of discharge to the initial position of this vessel and on the other hand the taking over by the regulator of the control of the other vessel.

Referring to FIG. 3, there are shown weighing means 8a, 8b for respectively weighing vessels 17a, 17b, signals corresponding to the measured weights being respectively applied to analyzers 9a, 9b which provide signals representing the weight of metal which has been emptied from the respective vessels. The reference voltage 10 is applied to timer 11 which generates a signal corresponding to the weight of metal according to the desired feed. The desired weight value and the value of the weight of metal actually emptied are applied to differential counter 12 which delivers a differential signal treated by regulator 13 and added to the reference voltage 10 at 14. The resulting voltage is applied to variator 15 which controls the speed of motor 16 driving a pump 18, the pump being selectively connected to hydraulic jacks 28a, 28b for selectively controlling the rate of tipping of vessels 17a, 17b in a manner which will be further described herebelow.

The apparatus further comprises detection means for detecting the appearance of flow of metal form each vessel, said detection means consisting for example of photoelectric cells 26a, 26b respectively, arranged in the vicinity of the spouts of vessels 17a, 17b; comparison means 27a, 27b for comparing the measured weights with a predetermined minimum weight value Pm corresponding to a predetermined degree of emptying of the vessels; a high delivery pump 20 driven by a motor 19 for selectively causing rapid tipping of the intermediate vessels 17a, 17b; and distributor relays 22a, 23a, 24a, 25a suitably actuated by the photoelectric cells 26a, 26b and the comparison means 27a, 27b in order to selectively connect each hydraulic jack either to pump 20, to pump 16, or to the atmosphere by way of distributors 22, 23, 24, 25 respectively so as to insure quick tipping of the corresponding vessel, then shifting of the tipping control to variator 15, then returning of the vessel to its initial position.

Each distributor is adapted to perform two functions corresponding to a so-called "work position" S and a "rest position" R. Actuating of each distributor is caused in a well known manner by closing a contact in order to excite a solenoid; opening of said contact causes the distributor to return to its rest position R through action of a spring. The distributors may be conventional hydraulic valves.

The contact for exciting each solenoid is actuated by the relay having the same reference numeral as the distributor itself with the subscript $a$; thus relay 22a when actuated causes distributor 22 to be set to its work position, etc.

Distributor 22 is adapted to selectively connect pump 18 to jacks 28a and 28b; distributor 23 is adapted to selectively connect pump 20 to jacks 28a and 28b; distributors 24 and 25 are respectively adapted to selectively connect jacks 28a or 28b to pump 16 or to the atmosphere through throttled ducts.

Motor 19 driving the pump 20 is started and stopped by means of a relay 21 actuated by the comparison means 27a, 27b in order to cause the starting of motor 19, and connected to the photoelectric cells 26a, 26b in order to cause the stopping of said motor. The operation of the apparatus will now be explained.

The initial tipping of a vessel, say vessel 17a, is caused by an operator by manually switching motor 19 on, the distributors being set in the following positions: 22R, 23R, 24S, 25R. Oil from pump 20 flows through distributors 23 and 24 to jack 28a causing the rapid tipping of vessel 17a, and flows toward distributor 22 where it is blocked. Oil from pump 18 flows through distributor 22 towards distributors 23, 25, where it is blocked.

From then on, the operation is fully automatic. Photoelectric cells 26a detects the appearance of flow of metal from vessel 17a and causes the distributors 22 and 23 to switch to their work position S and simultaneously causes motor 19 to stop. Oil from pump 18 flows at a regulated rate of delivery through distributors 22 and 24 towards jack 28a and causes vessel 17a to be tipped at a tipping speed controlled by variator 15.

When the weight of vessel 17a reaches the predetermined minimum weight value Pm, comparison means 27a generates a signal which causes distributor 25 to be set at its work position S and simultaneously actuates relay 21 to start motor 19. This causes oil from pump 20 to flow through distributors 23 and 25 to jack 28b thus causing rapid tipping of vessel 17b. Oil flowing from pump 20 towards distributor 22 is blocked in said distributor. During the initial tipping of vessel 17b, the vessel 17a remains under the control of variator 15.

When the photoelectric cell 26b detects the appearance of the flow of metal from vessel 17b, it causes the distributors 22, 23 and 24 to switch back to their rest position R, and simultaneously causes motor 19 to stop. Rapid tipping of vessel 17b is discontinued and oil from pump 18 flows through distributors 22 and 25 towards jack 28b causing vessel 17b to be tipped at a tipping speed controlled by variator 15. Oil in jack 28a simultaneously escapes through distributor 24 towards the atmosphere, the vessel 17a tilting back under its own weight to its initial position; the tilting back movement may be slowed down by throttling the escape duct.

When the weight of vessel 17b reaches the predetermined weight value Pm, comparison means 27b generates a signal which causes distributor 24 to be set at its work position S and simultaneously actuates relay 21 to start motor 19. This causes oil from pump 20 to flow through distributors 23 and 24 to jack 28a thus causing rapid tipping of vessel 17a until photoelectric cell 26a detects the appearance of flow of metal flowing from vessel 17a and causes the stopping of motor 18, the taking over by variator 15 of the control of the tipping speed of said vessel and the discharge to atmosphere of oil in jack 28b, thus proceeding with the continuation of the operation as hereabove explained.

The value of the desired weight P transferred from clock 11 to counter 12 is reset to zero each time any of the photoelectric cells generates a signal at the appearance of flow of metal from a vessel at the start of tipping. This resetting to zero does not disturb the operation of the apparatus, since the desired flow of metal is determined by the voltage value 10 which remains a constant.

The apparatus may further comprise memorizing means 29 which memorize the instantaneous value of the differential signal generated by the regulator 13. The value of said signal at the instant of switching of variator 15 from one vessel to the other vessel is caused to be transferred at the input of said variator 15 by means of the signals generated by either of the two photoelectric cells 26a, 26b at the occurrence of metal flowing from said vessels. This permits the differential signal which is likely to exist at the instant when control of the tipping speed of a vessel is switched to the other vessel to be taken into account, thus enabling improved performance of the operation of regulating the feed.

Figure 4:
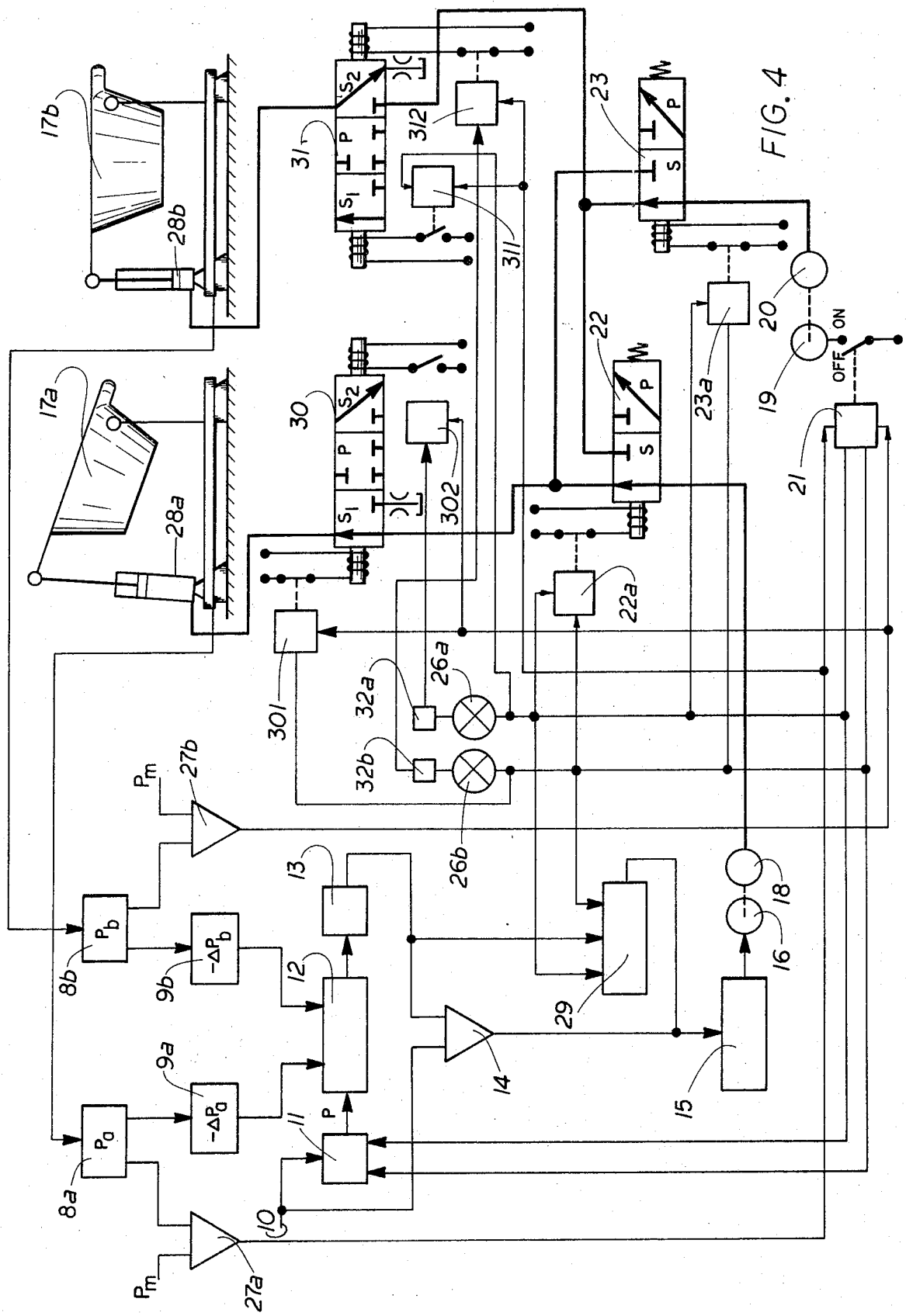
FIG. 4 is a more complete block diagram of a flow regulation system in accordance with another embodiment of the invention.

FIG. 4 illustrates an apparatus for regulating the flow according to the second manner of procedure above discussed, in which the excitation of the feed detection means causes on the one hand stoppage of the tipping of the vessel in the course of emptying, the metal continuing to be emptied from said vessel at a decreasing rate, and on the other hand initiates control by the regulation equipment of the vessel at the start of tipping by summing the flows running out of both intermediate vessels and acting on the rate of tipping of the vessel controlled by the regulation equipment so as to regulate the total flow.

The apparatus of FIG. 4 is substantially similar to the apparatus of FIG. 3 as regards the means for generating a control signal and the means for switching a high delivery pump or a control pump to either one of the jacks causing tipping of the vessels. The same reference numerals have therefore been used in FIG. 3 and FIG. 4 as far as the corresponding means remain identical and perform the same functions.

The two-function hydraulic distributors 24, 25 of FIG. 3 are replaced in FIG. 4 by three-function distributors 30, 31. The distributors 30, 31 are identical to each other and have two work positions which correspond to the two functions previously mentioned with reference to distributors 24, 25, e.g., a first work position $S_1$ corresponding to the function performed by distributors 24, 25 when set in their work position S, and a second work position $S_2$ corresponding to the function performed by distributors 24, 25 when set in their rest position R. Each of the two distributors 30, 31 is adapted to perform a third function corresponding to a rest position R, whereby a distributor is set at a rest position by means of a spring (not shown) when said distributor is not set at either of its two work positions $S_1$, $S_2$. Said third function corresponds to blocking a jack at any position.

The apparatus of FIG. 4 further comprises two comparison circuits 32a, 32b respectively connected to the photoelectric cells 26a, 26b and which are adapted to generate a signal when there is no signal at the output of said photoelectric cells, e.g., when there is no metal running out of the corresponding vessel.

The distributor 30 is set to its work position $S_1$ by exciting a solenoid through a relay 301 actuated by comparison means 27b. The relay 301 is also connected to the photoelectric cell 26b in order to cause deexcitation of the corresponding solenoid. The distributor 30 is set to its work position $S_2$ by means of exciting a solenoid through a relay 302 actuated by the comparison circuit 32a. Relay 302 is also connected to the comparison means 27b in order to cause deexcitation of the corresponding solenoid.

The distributor 31 is similarly set to its work position $S_1$ by means of a relay 311 connected to comparison means 27a. Relay 311 is also connected to the photoelectric cell 26a to cause deexcitation of the corresponding solenoid. Distributor 31 is set to its work position $S_2$ by means of a relay 312 connected to the comparison circuit 32b, said relay being also connected to the comparison means 27a to cause deexcitation of the corresponding solenoid. The relays thus may be bistable relays, or equivalent electronic devices.

The operation of the apparatus of FIG. 4 will be readily understood from the following explanation.

The initial tipping of a vessel, for example vessel 17a, is controlled by an operator by manually switching motor 19 on, the distributors being set at the following positions: 22R, 23R, $30S_1$, $31S_2$. Oil from pump 20 flows through distributors 23 and 30 to jack 28a causing quick tipping of vessel 17a, and flows toward distributor 22 where it is blocked. Oil from pump 18 flows through distributor 22 towards distributor 31 where it is blocked. From then on the operation of the apparatus proceeds automatically.

Photoelectric cell 26a detects the appearance of metal from vessel 17a and causes the distributors 22 and 23 to switch to their work position S and simultaneously causes motor 19 to stop. Oil from pump 18 flows at a regulated rate of delivery through distributors 22 and 30 to jack 28a and causes vessel 17a to be tipped at a tipping speed controlled by variator 15.

When the weight of vessel 17a reaches the predetermined minimum weight value Pm, comparison means 27a generates a signal which causes distributor 31 to be set to its work position $S_1$ and simultaneously actuates relay 21 to start motor 19. This causes oil from pump 20 to flow through distributors 23 and 31 to jack 28b, thus causing rapid tipping of vessel 17b. Oil flowing from pump 20 towards distributor 22 is blocked in said distributor. During the initial tipping of vessel 17b, vessel 17a remains under the control of variator 15.

When the photoelectric cell 26b detects the appearance of the flow of metal from vessel 17b, this causes the distributors 22, 23 and 30 to switch to their respective rest positions R and simultaneously causes motor 19 to stop. Rapid tipping of vessel 17b is discontinued and oil from pump 18 flows through distributors 22 and 31 towards jack 28b causing vessel 17b to be tipped at a tipping speed controlled by variator 15. Oil in jack 28a is blocked in distributor 30, the vessel 17a remaining in a tilted position corresponding to the position of said vessel at the instant of appearance of metal from vessel 17b. Thus the vessel 17a continues to be emptied but at a decreasing rate of emptying. Two signals corresponding to the respective values of the decrease in weight of vessels 17a and 17b are therefore introduced at the input of counter 12. The control signal at the input of variator 15 takes into account the sum of the flows running from both vessels and the rate of tipping of vessel 17b is therefore controlled by variator 15 with the effect of regulating the total flow.

The signal generated by the photoelectric cell 26b is also applied to clock 11 to reset to a zero value the value of the desired weight P, said desired value increasing again with a rate of increase fixed by the voltage value 10 in a similar manner as previously described with reference to FIG. 3. Moreover the differential signal generated by regulator 13 at the instant of discontinuing of the control of the rate of tipping of vessel 17a by variator 15 may be applied at the input of said variator at said instant through memorizing means 29, as it has been already explained with reference to FIG. 3.

When metal running out of vessel 17a discontinues flowing the comparison circuit 32a generates a signal which sets the distributor 30 to its work position $S_2$. Oil in jack 28a escapes through distributor 30 towards the atmosphere, the vessel 17a tilting back under its own weight to its initial untilted position where it may be refilled.

When the weight of the vessel 17b reaches the predetermined weight value Pm, comparison means 27b generates a signal which causes distributor 30 to be set at its work position $S_1$ and simultaneously actuates relay 21 to start motor 19. This causes oil from pump 20 to flow through distributors 23 and 30 to jack 28a thus causing rapid tipping of vessel 17a, which has been refilled in the meanwhile, until the photoelectric cell 26a detects the appearance of the flow of metal flowing from vessel 17a and causes the stopping of motor 19, the setting of distributors 22 and 23 at their work position S, the setting of distributor 31 at its rest position R, and the resetting to a zero value of the value P generated by clock 11. The two vessels thus discharge simultaneously, vessel 17b emptying at a decreasing rate and vessel 17a being tipped at a regulated speed of tipping controlled by variator 15, said variator receiving a control signal taking into account the sum of the flows running from both vessels. This procedure continues until the comparison circuit 32b generates a signal when metal stops flowing out of vessel 17b, said signal bringing distributor 31 to the work position $S_2$; oil from jack 28b discharges at the atmosphere and the vessel 17b returns to its untilted position. The successive operations then proceed again as hereabove described.

What is claimed is:

1. An apparatus for supplying a substantially constant flow of molten metal from metal supplying means to a metallurgical equipment comprising:

at least two intermediate tipping vessels, means for alternatively filling said vessels from said metal supplying means and emptying the vessels into said metallurgical equipment to obtain a continuous flow of molten metal;

means for determining the actual flow rate of metal running out from the vessel being emptied;

means for providing a reference quantity corresponding to a desired constant supplying flow rate of molten metal;

comparison means for developing a differential signal by comparing said actual flow rate and said desired constant flow rate to give a differential signal corresponding to the difference of said flow rates; and regulating control means responsive to said differential signal for controlling the speed of tipping of each of said tipping vessels so as to maintain said differential signal at a substantially zero value.

2. An apparatus according to claim 1, including cycling means for initiating alternatively the tipping of the vessel that is full when the vessel from which metal is running out reaches a predetermined degree of emptying then the return of the emptied vessel to its initial position.

3. An apparatus according to claim 2, including:

detection means for detecting the appearance of flow of metal from each vessel at the start of tipping, said detecting means developing a cycling signal at the moment when such flow of metal appears;

and switching means responsive to said cycling signal for switching said regulating means controlling the speed of tipping from the vessel in the course of being emptied to the full vessel to be emptied.

4. An apparatus according to claim 3, in which there is an overlapping of metal flows from both vessels, including means responsive to said cycling signal for stopping the tipping of the emptied vessel, the metal continuing to flow out from this vessel at a decreasing rate at the appearance of flow of metal from the full vessel, said comparison means developing said differential signal by comparing the sum of the flow rates from the two vessels and the desired constant flow rate during the overlapping of metal flows, whereby a truly continuous constant flow rate is obtained.

5. An apparatus according to claim 1 in which said metal supplying means include a ladle having an extending discharge element selectively movable between said intermediate vessels.

6. An apparatus according to claim 1 in which said means for determining said actual flow rate of metal includes a weighing means for generating an electric signal corresponding to the flow of metal.

7. An apparatus according to claim 1 including memorizing means connected between said comparison means and said regulating means for memorizing the instantaneous value of the differential signal, said memorizing means being also connected to the detection means in order to cause the instantaneous value of the differential signal to be transferred at the input of said regulating means when said detection means develop said cycling signal.

* * * * *